United States Patent
Schrey et al.

(10) Patent No.: US 6,395,052 B1
(45) Date of Patent: May 28, 2002

(54) METHOD FOR PRODUCING DIRECTLY-REDUCED IRON, LIQUID PIG IRON AND STEEL

(75) Inventors: Guenter Schrey, Linz; Herbert Gruenbacher, St. Marien, both of (AT)

(73) Assignee: Deutsche Voest-Alpine Industrieanlagenbau GmbH (DE)

( * ) Notice: Subject to any disclaimer, the term of this patent is extended or adjusted under 35 U.S.C. 154(b) by 0 days.

(21) Appl. No.: 09/554,046
(22) PCT Filed: Oct. 26, 1998
(86) PCT No.: PCT/EP98/06792
§ 371 (c)(1), (2), (4) Date: Jul. 6, 2000
(87) PCT Pub. No.: WO99/24627
PCT Pub. Date: May 20, 1999

(30) Foreign Application Priority Data

Nov. 10, 1997 (AT) .............................................. 1904/97

(51) Int. Cl.⁷ .............................................. C21B 13/14
(52) U.S. Cl. ..................... 75/10.38; 75/10.61; 75/10.63; 75/434; 75/549
(58) Field of Search ............................. 75/10.38, 10.61, 75/10.63, 434, 549

(56) References Cited

U.S. PATENT DOCUMENTS

| | | | |
|---|---|---|---|
| 3,403,018 A | 9/1968 | Thom | 75/25 |
| 4,069,315 A | 1/1978 | Wagner et al. | 423/105 |
| 4,119,455 A | 10/1978 | Cass et al. | 75/25 |
| 5,531,805 A | * 7/1996 | Worner | 75/10.63 |
| 5,853,453 A | * 12/1998 | Lehner et al. | 75/531 |

FOREIGN PATENT DOCUMENTS

| | | |
|---|---|---|
| AT | 376241 | 10/1984 |
| DE | 4123626 | 1/1993 |
| EP | 0183677 | 6/1986 |
| EP | 0623684 | 11/1994 |
| EP | 0676478 | 10/1995 |
| WO | 96/22950 | 8/1996 |
| WO | 96/34120 | 10/1996 |
| WO | 97/33004 | 9/1997 |

* cited by examiner

*Primary Examiner*—Melvyn Andrews
(74) *Attorney, Agent, or Firm*—Ostrolenk, Faber, Gerb & Soffen, LLP

(57) ABSTRACT

The invention relates to a process for producing directly reduced iron, liquid pig iron and steel, in which charge materials, which are formed from iron ore, preferably in lump and/or pellet form, and, if appropriate, additions, are reduced directly, in a first reduction zone, to form iron sponge, the iron sponge is smelted in a melter gasifier zone supplied with carbon carriers and oxygen-containing gas, to form liquid pig iron, and a reduction gas is generated, which gas, after off-gas cleaning, is introduced into the first reduction zone, where it is converted and drawn off as top gas, and in which process the top gas is subjected to off-gas cleaning, if appropriate is fed to a further reduction zone for direct reduction of iron ore to form iron sponge and, following reaction with the iron ore, is drawn off as export gas and is subjected to off-gas cleaning, and in which process the liquid pig iron and, if appropriate, the iron sponge from the further reduction zone are fed to a steelmaking process, in particular a steelmaking process which operates on the basis of an electric furnace method, and in which process the off-gases from the steelmaking process are subjected to cleaning, and to a plant for carrying out the method.

24 Claims, 1 Drawing Sheet

METHOD FOR PRODUCING DIRECTLY-REDUCED IRON, LIQUID PIG IRON AND STEEL

Figure 1:
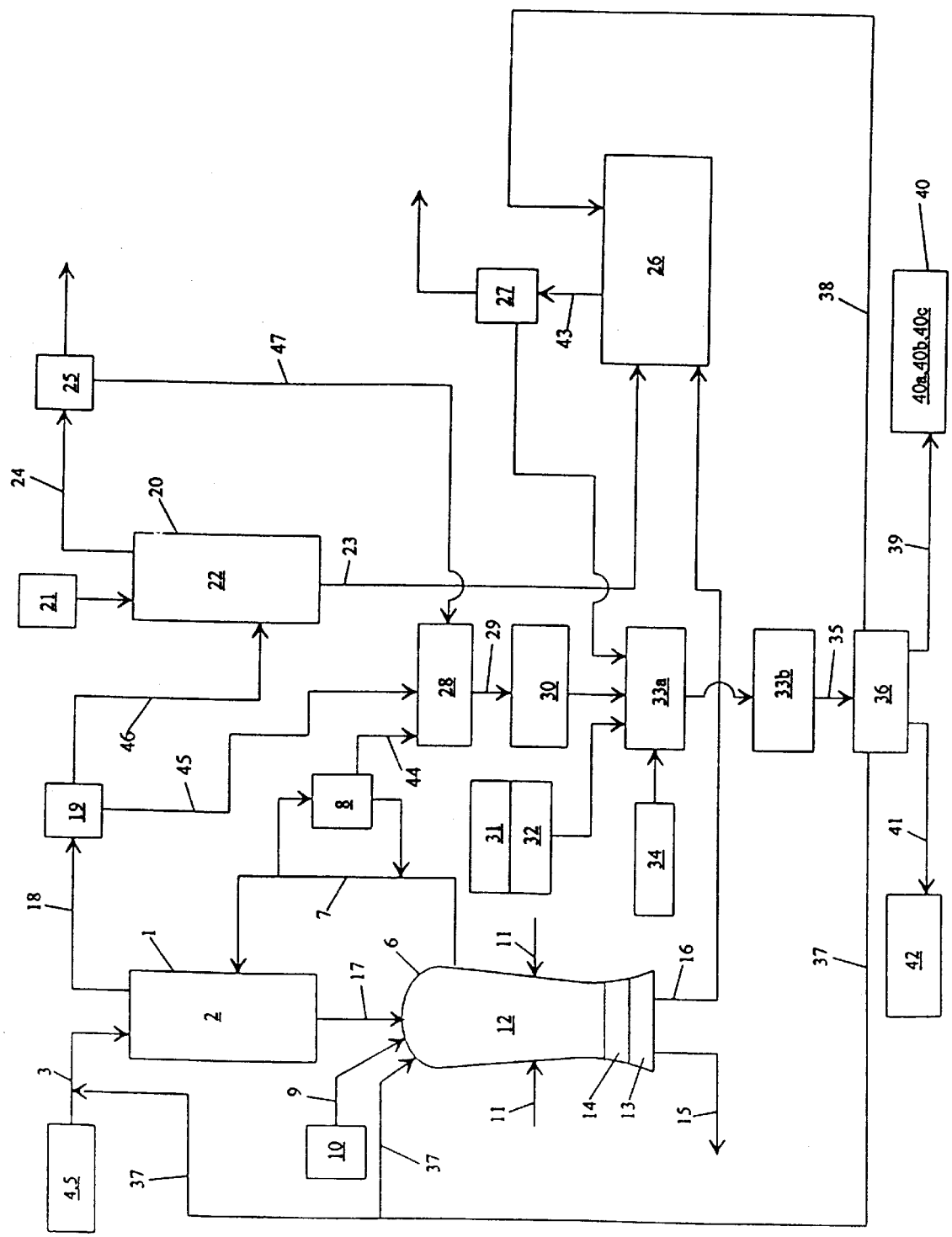

The invention relates to a process for producing directly reduced iron, liquid pig iron and steel, in which charge materials, which are formed from iron ore, preferably in lump and/or pellet form, and, if appropriate, additions, are reduced directly, in a first reduction zone, to form iron sponge, the iron sponge is smelted in a melter gasifier zone supplied with carbon carriers and oxygen-containing gas, to form liquid pig iron, and a reduction gas is generated, which gas, after off-gas cleaning, is introduced into the first reduction zone, where it is converted and drawn off as top gas, and in which process the top gas is subjected to off-gas cleaning, if appropriate is fed to a further reduction zone for direct reduction of iron ore to form iron sponge and, following reaction with the iron ore, is drawn off as export gas and is subjected to off-gas cleaning, and in which process the liquid pig iron and, if appropriate, the iron sponge from the further reduction zone are fed to a steelmaking process, in particular preferably a steelmaking process which operates on the basis of an electric furnace method, and in which process the off-gases from the steelmaking process are subjected to cleaning, and to a plant for carrying out the process.

Both during the cleaning of the reduction gas from the melter gasifier zone, of the top gas from the first reduction zone, if appropriate the cleaning of the export gas from the further reduction zone, and during the cleaning of the off-gases from the steelmaking process, dusts and/or sludges which contain both iron in oxide form and in metallic form as well as possibly coal dust are formed, depending on the cleaning method. These dusts and/or sludges constitute waste or residual materials, which it is desired to utilize in order to achieve waste-free smelting and for economic reasons in the metallurgical industry.

It is known for these residual materials to be landfilled on dumps. If possible, however, it is desired for landfilling of the residual materials and consequent loss of the products of value contained therein to be avoided and for the residual materials to be utilized with as little input of energy as possible and making optimum use of their products of value.

A process for utilizing waste and residual materials which contain iron in oxide form and/or iron in metallic form as well as carbon is known from AT-B-376,241. In this process, solids particles are separated out of the reduction gas and out of the top gas leaving the direct reduction zone in cyclones, and the solids which have been separated out are mixed with binder, such as iron oxide dust, are briquetted and are fed exclusively to the melter gasifier zone, the iron oxide dust being taken from a furnace-gas cleaning plant, so that the solids produced in the furnace-gas cleaning plant can also be utilized.

It is known from DE-A-41 23 626 for residual smelting plant materials to be agglomerated with the aid of binders, slag-forming agents and reducing agents and for the agglomerates to be introduced into the top burden area of a smelting unit, the preheating and drying of the agglomerates taking place in this burden area of the smelting unit. The burden passes through the smelting unit in counter current, initially passing into a reduction area provided in the interior of the smelting unit, after which it is smelted in the lower area of the smelting unit.

It is known from EP-A-0,623,684 for waste and residual materials containing coal dust and iron in metallic and oxide form to be collected separately in three groups according to their chemical compositions, in which case the first group is to contain primarily iron in oxide form, the second group is to contain primarily iron in metallic form, and the third group is to contain primarily carbon-containing substances. The utilization is brought about by employing the substances of the first group in the direct reduction zone and the substances belonging to the second and third groups directly in the melter gasifier zone.

This process has proven useful in particular if the waste and residual materials are formed separately, i.e. in groups, in accordance with the difference substances mentioned. However, sorting of the waste and residual materials from the metallurgical industry if iron in oxide form and iron in metallic form, as well as carbon, are produced in mixed form would be too costly.

WO 96/22950 has disclosed a process for utilizing dusts which are produced during the reduction of iron ore using a reduction gas and are separated out as sludges in a scrubber, the sludges being dewatered and used as starting material for cement production.

A common feature of all the above processes is that in each case only some of the dusts and/or sludges produced in the metallurgical industry are utilized. Other waste materials, some of which contain high concentrations of heavy metals and/or non ferrous metals, have to be disposed of in a conventional way, i.e. at landfill sites.

It is known from WO 96/34120 for iron-containing residual smelting materials which are separated out as sludges during the scrubbing of off-gases, i.e., for example, furnace gas, reduction gas and converter off-gas, to be agglomerated and used entirely in a steelmaking process which operates using the basic oxygen process, together with pig iron, scrap and/or iron ore and/or iron sponge. A drawback of this process is that high levels of accompanying elements which are undesirable for steelmaking, such as non-ferrous metals and heavy metals, are present in the steelmaking process owing to the reintroduction of the agglomerates. For this reason, a proportion of the sludges which have been separated out has to be continuously ejected. This results in high operating costs for the process, since the ejected proportion of the sludges again has to be landfilled. This process is also unsuitable for implementing a closed circuit in the metallurgical industry.

The invention aims to avoid the drawbacks which are known from the prior art and is based on the object of providing a process for producing iron sponge, liquid pig iron and steel, in which all the dusts and/or sludges which are separated out during the off-gas cleaning are fed for further utilization. In particular, it is intended for the process according to the invention to enable the dusts and/or sludges which are separated out to be fed to various utilization options irrespective of their composition, i.e. the off-gas from which they are separated. Furthermore, it is intended that landfilling, which, owing to the levels of heavy metal compounds, was hitherto required during the utilization of such dusts and/or sludges, should be avoided altogether.

According to the invention, this object is achieved by the fact that the iron-containing dusts and/or sludges which are separated off during the cleaning of the off-gases from the steelmaking process are agglomerated together with other dusts and/or sludges which are formed during the off-gas cleaning of the reduction gas from the melter gasifier zone, during the off-gas cleaning of the top gas from the first reduction zone, and if appropriate, during the off-gas cleaning of the export gas from the further reduction zone, and the agglomerates are fed for further utilization as charge materials for iron metallurgy smelting and/or reduction processes and/or cement production, and that the liquid pig iron produced and, if appropriate, the iron sponge from the further reduction zone, as well as any dusts and/or sludges produced during the process and/or agglomerates formed therefrom, as well as, if appropriate, plant scrap, form the only iron-containing charge materials for the steelmaking process.

The process according to the invention for the first time makes it possible for all the dusts and/or sludges which are separated out during the off-gas cleaning in a system comprising iron sponge production, pig iron production and steelmaking, to be agglomerated together and for the mixed agglomerate produced to be fed for further utilization. Since the only iron-containing charge materials for the steelmaking process are the product from the melter gasifier zone, i.e. liquid pig iron and, if appropriate, the product from a further reduction zone, i.e. iron sponge, the dusts and/or sludges which are separated out during the off-gas cleaning of the steelmaking process are free of heavy-metal components.

Advantageously, the top gas which leaves the first reduction zone, the possible export gas which leaves the further reduction zone, as well as at least part of the reduction gas which leaves the melter gasifier zone are subjected to gas scrubbing, and the sludges to be agglomerated which are produced in each case undergo further treatment together. This makes it possible to minimize investment costs.

According to a preferred embodiment of the process according to the invention, the sludges which are to be agglomerated are firstly dewatered down to a residual moisture content, with the result that the volume of the sludges is reduced and handling of the sludges in subsequent processing steps is facilitated. Advantageously, the off-gases which leave the steelmaking process are subjected to dry dedusting, and the resultant dusts are treated further together with the dewatered sludges which are to be agglomerated.

The dewatered sludges which are to be agglomerated are mixed, preferably in a two-step continuous process, with the dusts produced during the dry dedusting of the steelmaking process, with further oxide dusts, calcined lime and, if appropriate, coal dust, and are then granulated. The oxide dusts are expediently derived from a plant for carrying out the process, for example from the product dedusting of the further reduction zone, and/or from the casting bay dedusting unit of a steel-processing process which is connected downstream of a plant for carrying out the process.

The granules are expediently dried before being re-utilized. This increases both the strength of the granules and their thermal stability.

In previous steelmaking processes it was and remains necessary to purchase and use scrap, so-called external scrap. This external scrap contains, inter alia, heavy metals, such as lead and zinc, and is responsible for the known problems of steelmaking which result from high levels of these heavy metals being formed in the gas phase of the electric furnace. In the process according to the invention, the use of external scrap is no longer required, since liquid pig iron and optionally iron sponge form the charge materials for the steelmaking process, and because the mixed agglomerate can be used to very good effect as scrap replacement material, owing to its oxidic iron content. At the very least, so-called plant scrap, as produced during a steel-processing process connected downstream of the process according to the invention, can be used in the steelmaking process. However, this plant scrap is free of heavy metals and consequently does not cause any heavy metals to be introduced.

According to the invention, the agglomerates are advantageously re-utilized in a further steelmaking process, in particular a process which operates on the basis of the electric-furnace method or the basic oxygen process.

Furthermore, according to the invention, the re-utilization of the agglomerates is advantageously effected by feeding them to the melter gasifier zone and/or the first reduction zone. Due to their carbon content, the agglomerates contribute valuable energy to the melter gasifier zone. In the first reduction zone, the oxidic iron content is reduced to form metallic iron or iron sponge, while the carbon content of the agglomerates is partially converted into reduction gas, making a valuable contribution to the quality of the top gas.

According to a further embodiment, the re-utilization of the agglomerates is effected by feeding them to a blast-furnace process. Owing to the chemical composition of the agglomerates, and owing to the mechanical strength which can be achieved, they are eminently suitable for use in a blast-furnace process, in which case the carbon content once again contributes energy.

Advantageously, according to the invention, the agglomerates are used as starting material for cement production. Since the components of the cement material which are required for the production of cement, namely iron oxides, silicon oxide, aluminium oxide and calcium oxide or calcium hydroxide are already present in the agglomerates, these agglomerates may, for example, be added to a tubular rotary kiln installation for production of cement.

Material flow rates in the process according to the invention (with a further reduction zone present):

| | |
|---|---|
| liquid pig iron from the melter gasifier zone: | approx. 80 t/h |
| iron sponge from further reduction zone: | approx. 98.5 t/h |
| steel from the steelmaking process: | approx. 160 t/h | wet scrubber sludges (dry matter) and dusts:

| | |
|---|---|
| from reduction gas and top gas scrubbing: | approx. 4.6 t/h |
| from export gas scrubbing: | approx. 6.5 t/h |
| dusts from off-gas from the steelmaking process: | approx. 2.5 t/h |
| further oxide dusts: | approx. 0.5 t/h |

The granules produced according to the invention comprise the following principal components (in percent by weight, based on dry matter):

| | |
|---|---|
| iron and iron oxides: | 50–60% |
| calcium hydroxide: | 20–25% |
| carbon: | 10–14% |
| coal ash constituents, such as $Al_2O_3$, $SiO_2$, etc.: | 4–7% |

The invention is explained in more detail below with reference to an exemplary embodiment which is illustrated in the drawing, FIG. 1, the drawing diagrammatically depicting a preferred embodiment of the plant for carrying out the process according to the invention.

Lumpy iron-oxide-containing charge materials, such as ore (4), if appropriate with uncalcined additions (5), are introduced from the top, via a feed line (3), into a reduction reactor which is designed as a shaft furnace (1), i.e. into its reduction zone (2). The shaft furnace (1) is connected to a melter gasifier (6), in which a reduction gas is generated from carbon carriers and oxygen-containing gas, which reduction gas is fed to the shaft furnace (1) via a feed line (7) and flows through the latter in counter current with respect to the charge materials (4, 5). In the feed line (7), there is a gas-cleaning and gas-cooling device, which is designed as a scrubber (8), through which at least a partial stream of the reduction gas is guided in order to establish an appropriate temperature.

The melter gasifier (6) has a feed line (9) for solid, lumpy carbon carriers (10) and feed lines (11) for oxygen-containing gases. In the melter gasifier (6), molten pig-iron (13) and molten slag (14) collect beneath the melter gasifier zone (12) and are tapped off via a tap (16, 15).

The charge materials (4, 5), which have been partly or completely reduced to iron sponge in the reduction zone (2) of the shaft furnace (1), are fed to the melter gasifier (6) via one or more conveyor lines (17), for example by means of worm conveyors. A discharge line (18) for the top gas formed in the reduction zone is connected to the top part of the shaft furnace (1). To remove dust and steam, this top gas is fed to a gas-cleaning device, which is likewise designed as a scrubber (19).

The top gas which has been cleaned in the scrubber (19) is available, after $CO_2$ elimination (not shown), as a reduction gas, if appropriate for a further reduction reactor (20), which gas is introduced into the shaft furnace (20) via a reduction-gas feed line (46).

The further reduction reactor (20) is likewise designed as a shaft furnace and, like the first reduction reactor (1), operates using the counter-current principle. In this further reduction reactor (20), iron ore (21) in lump and/or pellet form is likewise directly reduced to iron sponge in a reduction zone (22), which iron sponge is removed from the shaft furnace (20) via a removal means (23).

The export gas which is drawn off from the further reduction reactor (20) via a line (24) is likewise subjected to cleaning and cooling in an export-gas scrubber (25), in order to remove dust particles and reduce the steam content, after which it can be fed for further use.

The pig iron which is tapped off from the melter gasifier (6), as well as, if appropriate, the iron sponge removed from the further reduction reactor (20), are added to an electric furnace (26) for steelmaking. The dust-laden off-gases formed during steelmaking in this electric furnace (26) are cleaned in a dedusting installation (27).

The sludges which are formed in the scrubbers for the reduction gas (8), the top gas (19) and, if appropriate, the export gas (25) are fed to a thickener (28). From the thickener (28), the thickened sludges are fed, via a conveyor line (29), to a sludge-drying device (30), for example a decanter centrifuge.

The dewatered sludges are mixed with the dusts formed in the dedusting installation (27) for the off-gases from the electric furnace (26), with further oxide dusts (31), such as abraded ore and casting bay dusts, and coal dust (32) in the mixer (33a) of a mixing and granulating device (33a, 33b). Furthermore, calcined lime (34) is added to the mixer (33a) in order to further reduce the residual moisture content of the dewatered sludges and as a binder. This mixture of sludges, dusts and calcined lime is then fed to the granulator (33b) of the mixing and granulating device (33a, 33b). The granulation of the mixture comprising sludges, dusts and calcined lime therefore takes place in two steps in the mixing and granulating device (33a, 33b). In the two-step granulation method, the method steps of mixing and granulating take place in separate reactors which are of different sizes, are equipped with separate drives and have mixing and granulating tools which are adapted to the jobs of mixing, on the one hand, and granulating, on the other hand.

The granules are fed to a drying device (36) via a conveyor line (35). The granules are preferably dried continuously in a third unit after granulation. This unit may be fitted with a heatable jacket.

Due to their chemical composition and their mechanical properties, the granules produced according to the invention can be beneficially utilized for many purposes.

According to one embodiment, the dried granules are introduced into the shaft furnace (1) via a conveyor line (37) and via the feed line (3) for the lumpy iron-oxide-containing charge materials (4) and the additions (5). According to a further embodiment, the granules are introduced into the melter gasifier via the conveyor line (37).

According to a further embodiment of the invention, the granules are introduced into the electric furnace (26) via a conveyor line (38). According to the invention, in a further embodiment, the granules are fed by means of a conveyor line or a means of transport (39), for example by rail, to a smelting and/or reduction unit (40) which is spatially separated from the plant according to the invention, for example a blast furnace (40a), or a further steelmaking unit, preferably a steel converter (40b) or electric furnace (40c).

According to a further embodiment, the granules are fed to a cement production process (42) by means of a means of transport (41), for example by rail.

In this way, it is possible for all the dusts and/or sludges which are produced during the scrubbing (8, 19, 25) or dedusting (27) of both the reduction gas from the melter gasifier (6), the top gas from the first reduction reactor (1), the off-gases from the steelmaking unit (26) and, if appropriate, the export gas from the further reduction reactor (20) to be utilized in such a way that they provide added value, by feeding the agglomerates formed from the dusts and/or sludges to the first reduction zone (2) and/or the melter gasifier zone (12) and/or the steelmaking unit (26) and/or the cement industry (42) and/or a further smelting and/or reduction unit (40). The scrap-free method of operating the steelmaking unit (26), which is preferably designed as an electric furnace, makes it possible, for the first time, for all the waste and residual materials which are formed during the off-gas cleaning in such a plant for producing pig iron, iron sponge and steel to be utilized together.

What is claimed is:

1. A process for the production of direct-reduced iron, hot metal and steel, wherein input materials formed by iron ore are directly reduced to sponge iron in a first reduction zone, the sponge iron is melted to hot metal by feeding carbon-bearing materials and oxygenous gas and a reduction gas is generated which, after off-gas purification, is fed into the first reduction zone, where it is converted and drawn off as top gas, and wherein the top gas is subjected to an off-gas purification process, and wherein the hot metal is fed to a steelmaking process and wherein the off-gases of the steelmaking process are purified, wherein:

the iron-bearing dusts and/or sludges separated during the purification of the off-gases of the steelmaking process are agglomerated jointly with other dusts and/or sludges accumulating during off-gas purification of the top gas from the first reduction zone and the agglomerates are further utilized as input materials for the melting and/or reduction processes of iron metallurgy and/or for cement production; and an iron-bearing material is formed which provides the steelmaking process with the total amount of iron necessary for the steelmaking process and which consists of the hot metal produced as well as any dusts and/or sludges accumulating during the process and the agglomerates produced thereof.

2. A process according to claim 1, wherein the top gas which leaves the first reduction zone, the possible export gas which leaves the further reduction zone, as well as at least part of the reduction gas which leaves the melter gasifier zone are scrubbed, and the sludges to be agglomerated which are produced in each case undergo further processing together.

3. A process according to claim 1, the off-gases which leave the steelmaking process are subjected to dry dedusting, and the resultant dusts are agglomerated together with the sludges which are to be agglomerated.

4. A process according to claim 1, wherein the sludges which are to be agglomerated are firstly dewatered down to a residual moisture content.

5. Process according to claim 4, characterized in that the dewatered sludges which are to be agglomerated are mixed with the dusts produced during the dry dedusting of the steelmaking process, with further oxide dusts, if appropriate coal dust and calcined lime, and are granulated.

6. A process according to claim 4, wherein the dewatered sludges which are to be agglomerated are mixed with the dusts produced during the dry dedusting of the steelmaking process, with further oxide dusts, and with calcined lime, and are then granulated.

7. A process according to claim 5, wherein oxide dusts from a plant for carrying out the process according to claim 1 or from a casting bay dedusting unit of a steel-processing process which is connected downstream of such a plant are used.

8. A process according to claim 1, wherein the agglomerates or granules are dried before being re-utilized.

9. A process according to claim 1, wherein the agglomerates are fed to the steelmaking process in order to be re-utilized.

10. A process according to claim 1, wherein the agglomerates are used in a further steelmaking process in order to be re-utilized.

11. A process according to claim 1, wherein the agglomerates are fed to the melter gasifier zone and/or the first reduction zone in order to be re-utilized.

12. The process as claimed in claim 1, wherein the agglomerates are fed to a blast-furnace process in order to be re-utilized.

13. Process according to claim 1, wherein the agglomerates are used as starting material for cement production.

14. A process according to claim 1, wherein said iron ore is in the form of lumps and/or pellets.

15. A process according to claim 14, wherein said iron ore is in the form of additives.

16. A process according to claim 1, wherein said steelmaking process is an electric arc process.

17. A process according to claim 10, wherein said steelmaking process is an electric furnace method.

18. A process according to claim 10, wherein said steelmaking process is a basic oxygen process.

19. A process according to claim 1, wherein the top gas, subsequent to an off-gas purification process, is fed to a further reduction zone for the direct reduction of sponge iron, and then drawn off as export gas and subjected to an off-gas purification process.

20. A process according to claim 19, wherein, in addition to the hot metal, the sponge iron from the further reduction zone is also fed to a steel making process.

21. A process according to claim 19, wherein the dust and/or sludge accumulating during the off-gas purification of the export gas from the further reduction zone are also utilized as input materials for the melting and/or reduction process of iron metallurgy and/or for cement production.

22. A process according to claim 19, wherein the total amount of iron provided for the steelmaking process includes the sponge iron from the further reduction zone.

23. A process according to claim 22, wherein said total amount of iron also includes plant scrap.

24. A process according to claim 10, wherein said further steelmaking process is one which operates on the basis of an electric furnace method or the basic oxygen process.

\* \* \* \* \*